UNITED STATES PATENT OFFICE.

GOTTHOLD FUCHS, OF STOLBERG, GERMANY, ASSIGNOR TO CHEMISCHE FABRIK RHENANIA, OF AIX-LA-CHAPELLE, GERMANY.

MEDICINAL PRODUCT.

SPECIFICATION forming part of Letters Patent No. 635,471, dated October 24, 1899.

Application filed July 12, 1898. Serial No. 685,730. (No specimens.)

*To all whom it may concern:*

Be it known that I, GOTTHOLD FUCHS, doctor of philosophy, a subject of the King of Prussia, Emperor of Germany, residing at Stolberg, Rhenish Prussia, in the Kingdom of Prussia, Germany, have invented certain new and useful Improvements in a Soporiferous Remedy—viz., dimethyl-ethyl-carbinol-chloral—of which the following is a specification.

The fact that in medical circles the discovery of innocuous means producing a lasting and refreshing sleep is forming the object of constant researches has led to an exhaustive study of the well-known soporiferous remedies—such as chloral hydrate, sulfonal, trional, paraldehyde, and amylene dydrate—in connection with experiments on animals. These have shown that chloral hydrate acts most promptly and is in this respect far superior to all others, but, on the other hand, it possesses decidedly poisonous properties of a dangerous character. The results of these experiments led to the idea of combining chloral with another chemical substance which would considerably reduce its poisonous properties without affecting its hypnotic action. Considerations which will be exposed farther on led to the present invention—namely, the reaction of chloral on amylene hydrate.

This invention had for its starting-point the idea that chloral reacting on dimethyl-ethyl-carbinol as tertiary alcohol would form either a chloral alcoholate or an acetal. These ether-like compounds do not readily dissolve in water and are for this reason more slowly taken up. The splitting off into constituent parts must take place first in the blood, by which a gradual, lasting, but less poisonous action is obtained. The reaction product under consideration has not only justified these suppositions, but also greatly exceeded all expectations. Subcutaneous injections of chloral, both in the form of chloral hydrate and of dimethyl-ethyl-carbinol-chloral, in animals whose bodies are all of the same weight have shown that in the latter case twenty per cent. more chloral than the lethal dose is easily supported. Sleep was produced slowly and gradually and in one and a half hour was most profound.

The mode of preparation will now be described. Amylene hydrate is mixed with a little more than the calculated amount of chloral. If small amounts are operated upon, the reaction must be brought about by heating the mixture cautiously. With amounts of one hundred to two hundred grams the reaction takes place unassisted, and with larger quantities cooling has to be resorted to to moderate it. In order to obtain a good production, the temperature during the reaction should not exceed 70° centigrade, as with a higher temperature a product would be obtained which is soluble in water and possesses no uniformity. After cooling the reaction product is washed two or three times with water and then left to dry two or three days over chloride of calcium.

Dimethyl-ethyl-carbinol-chloral results from the condensation of molecular amounts of dimethyl-ethyl-carbinol (amylene hydrate) and chloral, as shown by the following formula, the exactness of which has been confirmed by analysis:

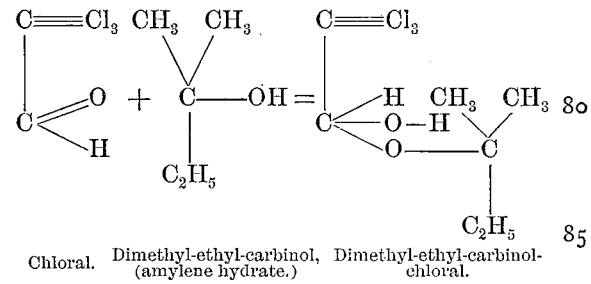

Chloral.   Dimethyl-ethyl-carbinol, (amylene hydrate.)   Dimethyl-ethyl-carbinol-chloral.

This compound possesses the following properties: It is an oily colorless liquid of a specific gravity 1.25 to 1.28, possessing a peculiar camphor-like smell and a cooling burning taste. It is quite insoluble in cold water; but on prolonged heating in water it suddenly dissolves, evolving at the same time gases and being completely decomposed. It mixes in all proportions with alcohol, ether, acetone, chloroform, and liquid fats. When it is heated it decomposes and evolves gases.

Dimethyl-ethyl-carbinol-chloral is isomeric with chloral-amyl-alcoholate, (as described in *Berliner Berichte*, Part III, pages 444, 445, and *Liebig's Annalen*, 157, 244.) It differs, however, entirely from the latter in its chemical, physical, and physiological behavior.

What I claim is—

As a new industrial product, a soporiferous remedy obtained by the reaction of chloral on amylene hydrate and possessing the following properties: It is an oily colorless liquid having a specific gravity of 1.25 to 1.28, a peculiar camphor-like smell, a cooling burning taste, decomposing when heated by itself, insoluble in cold water, but soluble and suddenly decomposing completely when heated for some time with water, and capable of being mixed in all proportions with alcohol, ether, chloroform, acetones and liquid fats, substantially as specified.

In witness whereof I have hereunto signed my name in the presence of two subscribing witnesses.

GOTTHOLD FUCHS.

Witnesses:
FRITZ STOLLEWERK,
JOHN HECKMANNS.